No. 628,321. Patented July 4, 1899.
A. R. HEYLAND & J. H. GRAY.
MINERAL LODE TRACER.
(Application filed Dec. 13, 1898.)
(No Model.)
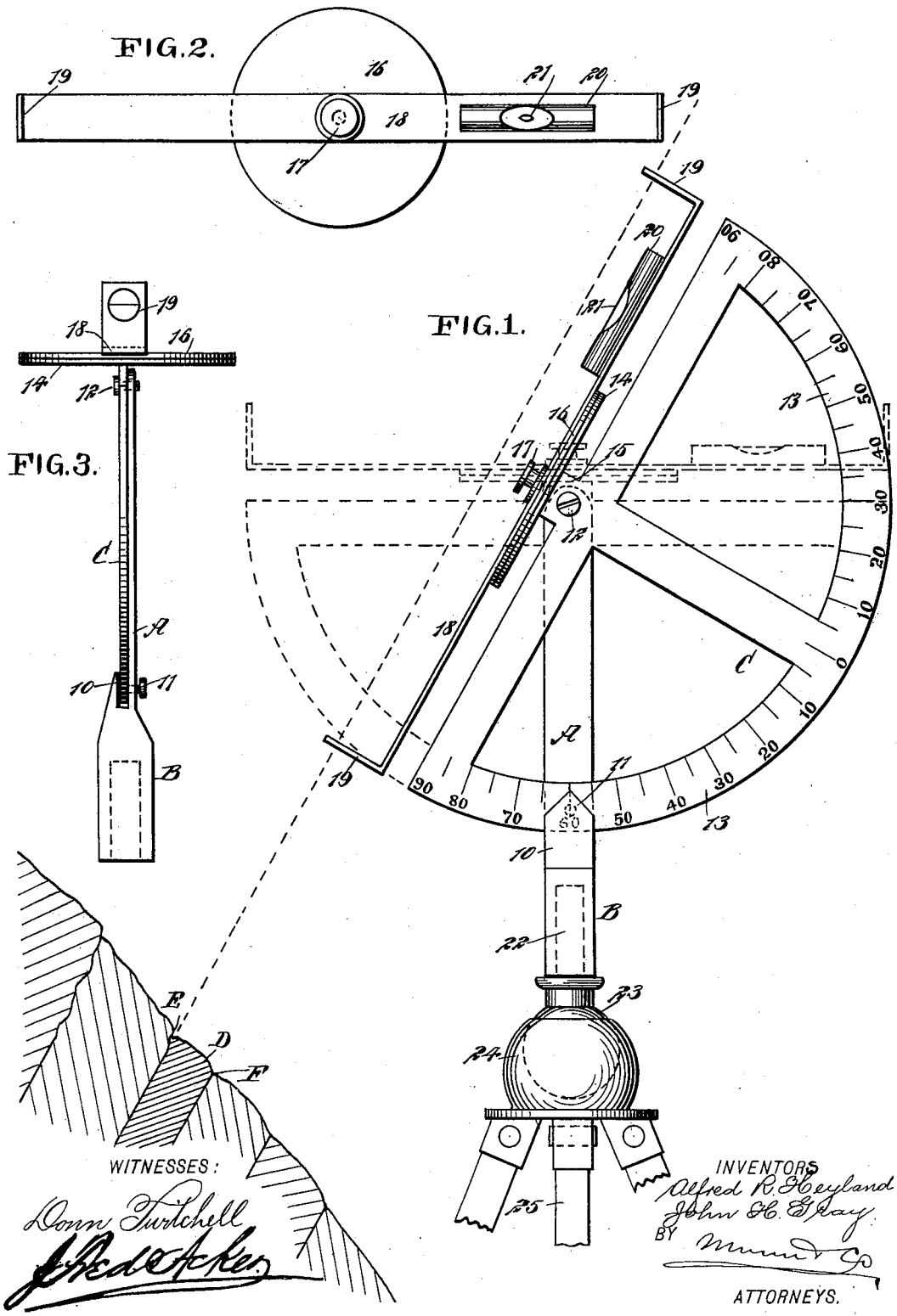
WITNESSES:
INVENTORS
Alfred R. Heyland
John H. Gray
BY
ATTORNEYS.

UNITED STATES PATENT OFFICE.

ALFRED ROWLEY HEYLAND AND JOHN HAMILTON GRAY, OF KASLO, CANADA.

MINERAL-LODE TRACER.

SPECIFICATION forming part of Letters Patent No. 628,321, dated July 4, 1899.

Application filed December 13, 1898. Serial No. 699,177. (No model.)

*To all whom it may concern:*

Be it known that we, ALFRED ROWLEY HEYLAND and JOHN HAMILTON GRAY, of Kaslo, West Kootenay, in the Province of British Columbia and Dominion of Canada, have invented a new and Improved Mineral-Lode Tracer, of which the following is a full, clear, and exact description.

The instrument is for the purpose of tracing on the surface a lode or any vein containing mineral; and the object of the invention is to provide an instrument of the character described that will be simple, durable, economic, accurate, and light.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a side elevation of the instrument represented as set on the dip and plane of the vein or lode. Fig. 2 is a plan view of the instrument, and Fig. 3 is an edge view of the body portion of the instrument.

The instrument proper consists of a standard A, provided with an enlarged base B, the said base having formed at its top a pointer 10, which extends upward parallel with the standard A for any suitable distance. An arc plate C is carried by the standard A, and the cylindrical portion of the arc is adapted to have movement in the space between the standard A and pointer 10, the arc being held in adjusted position by a set-screw 11, located in said standard opposite said pointer, as shown in Fig. 3. The arc is pivoted to the upper portion of the standard A by means of a suitable pin 12, located at the central portion of its straight edge, and a scale of degrees 13 is produced at the cylindrical edge of the arc upon that surface which faces the pointer, the scale of degrees reading, preferably, from naught at the center of the arc to about ninety degrees at the ends, the scales reading in opposite directions from the cipher.

A plate 14, preferably circular, is secured upon a projection 15 from the central portion of the straight edge of the arc, and a second and similar plate 16 is mounted to turn on the plate attached to the arc through the medium of a pivot pin or screw 17, which passes through the upper plate into the lower one. An arm 18 is secured to the upper plate 16, the pivot-pin 17 passing through the central portion of the arm 18, and the arm 18 is provided at each of its ends with a sight 19, and near one end a casing 20 is located upon the upper surface of the arm, being adapted to hold a leveling instrument 21, or the said leveling instrument may be attached directly to the said arm.

The base B of the standard A is made hollow in order to receive a stem 22, attached to a ball 23, which ball is mounted to turn in a socket 24, and the socket 24 is preferably attached to the top plate of a tripod 25 or other support.

D represents the vein or lode, E the hanging wall of the vein or lode, and F the foot-wall of said vein or lode, as shown in Fig. 1.

In operation the standard A is set plumb through the medium of the leveling instrument 21, as shown in dotted lines in Fig. 1. Next by turning the ball 23 in its socket 24 the arc C is set in a plane perpendicular to the lode, as illustrated, and then the arc is swung on its pivot 12 until the pointer 10 indicates on the graduation 13 an angle—sixty degrees, for example—corresponding to the dip of the lode. The arc is then secured in its adjusted position by means of the set-screw 11. The arm 18 can now be turned on its axis 17, and it will move on the same plane as the vein or lode, enabling said vein or lode to be located at points where it is not visible.

Having thus described our invention, we claim as new and desire to secure by Letters Patent—

The combination of the support, the standard mounted to turn thereon about a vertical axis, the pointer secured to the standard and spaced from the body thereof, the arc pivoted to the standard about a horizontal pivot located above the pointer, the said arc extending in the space between the pointer and the adjacent portion of the body of the standard, a set-screw arranged in the body of the standard opposite the pointer and arranged to engage said arc, a sight-arm carried by the arc centrally and mounted to rotate about an axis perpendicular to that of the arc, and a leveling instrument carried by the sight-arm, substantially as described.

ALFRED ROWLEY HEYLAND.
JOHN HAMILTON GRAY.

Witnesses:
GEORGE E. MARTIN,
DUNCAN C. CARMICHAEL.